(12) United States Patent
Kumagai et al.

(10) Patent No.: US 8,284,269 B2
(45) Date of Patent: Oct. 9, 2012

(54) IMAGE PICKUP APPARATUS

(75) Inventors: Akira Kumagai, Tokyo (JP); Hiroshi Kikuchi, Zushi (JP)

(73) Assignee: Canon Kabushiki Kaisha, Tokyo (JP)

( * ) Notice: Subject to any disclaimer, the term of this patent is extended or adjusted under 35 U.S.C. 154(b) by 37 days.

(21) Appl. No.: 12/858,271

(22) Filed: Aug. 17, 2010

(65) Prior Publication Data

US 2011/0050932 A1    Mar. 3, 2011

(30) Foreign Application Priority Data

Aug. 26, 2009   (JP) .................. 2009-195466

(51) Int. Cl.
  *H04N 5/225*   (2006.01)
  *H04N 5/222*   (2006.01)
(52) U.S. Cl. ............... 348/220.1; 348/333.09; 348/341
(58) Field of Classification Search .............. 348/220.1, 348/E5.024, 216, 218, 223, 373, 383, 378; 396/220.1, 333.09, 341, E5.024
See application file for complete search history.

(56) References Cited

U.S. PATENT DOCUMENTS

| | | | |
|---|---|---|---|
| 2004/0136685 A1 | 7/2004 | Ota et al. | |
| 2005/0157184 A1 | 7/2005 | Nakanishi | |
| 2006/0215040 A1* | 9/2006 | Sugawara | 348/220.1 |
| 2008/0303936 A1* | 12/2008 | Muramatsu et al. | 348/335 |
| 2009/0303339 A1* | 12/2009 | Kudo et al. | 348/222.1 |

FOREIGN PATENT DOCUMENTS

| | | |
|---|---|---|
| JP | 8-205009 A | 8/1996 |
| JP | 2005-208194 A | 8/2005 |

OTHER PUBLICATIONS

Canon EOS REBEL T1i/500D manual, Apr. 2009, Pertinent pages (16,17,42,244).*
DXG-503 Users Manual, Version May 31, 2005, pp. 1-57.

* cited by examiner

*Primary Examiner* — Lin Ye
*Assistant Examiner* — Euel Cowan
(74) *Attorney, Agent, or Firm* — Canon U.S.A., Inc. IP Division

(57) ABSTRACT

When the shooting mode selector lever switches the shooting mode to the still image shooting mode, the viewfinder mode is switched to the optical viewfinder mode, and switching from the optical viewfinder mode to the electronic viewfinder mode is performed by operation of the start-stop button. When the shooting mode selector lever switches the shooting mode to the movie shooting mode, the viewfinder mode is switched to the electronic viewfinder mode, and movie shooting is started by operation of the start-stop button.

3 Claims, 4 Drawing Sheets

IMAGE PICKUP APPARATUS

BACKGROUND OF THE INVENTION

1. Field of the Invention

The present invention relates to image pickup apparatus, and more particularly to an image pickup apparatus capable of switching modes and capable of selecting shooting conditions for still image shooting.

2. Description of the Related Art

In image pickup apparatuses, conventionally, well-known methods for viewing an object image are those using an optical viewfinder and using an electronic viewfinder. In a viewing method using an optical viewfinder, light flux for viewing is reflected by a mirror to present an object image, which is viewed by the user through the optical viewfinder. In a method of viewing with an electronic viewfinder, light flux for viewing is captured by, for example, a CMOS image sensor to display an object image on, e.g., a liquid crystal display device, which is viewed by the user.

Regarding capturing an object image with image pickup apparatuses, still image shooting and movie shooting are both well-known. In still image shooting, light flux for viewing is captured by, for example, a CMOS image sensor to display an object image on, for example, a liquid crystal display device. In movie shooting, light flux for viewing is continuously captured by, e.g., a CMOS image sensor for a short time, and the continuously captured still image is continuously reproduced on, e.g., a liquid crystal display device for a short time. Typically, when an image pickup apparatus performs still image shooting or movie shooting, imaging conditions are optimized to meet the purposes of each type of shooting; a still image shooting mode and a movie shooting mode are provided in such a manner.

As is well known, there are compact digital cameras and video cameras that improve operability in switching between a still image shooting mode and a movie shooting mode to perform still image shooting and movie shooting, respectively. For example, Japanese Patent Application Laid-Open No. 2005-208194 discusses a compact digital camera capable of instantaneous switching between a still image shooting mode and a movie shooting mode. Also, Japanese Patent Application Laid-Open No. 8-205009 discusses a video camera designed such that a user can perform shooting without making an error in switching between a still image shooting mode and a movie shooting mode.

Some recent-model digital single-lens reflex cameras are also capable of movie shooting. Such digital cameras have three shooting modes (namely, an optical viewfinder still image mode, a live view still image mode, and a movie mode) as will be discussed later in detail, and are switchable among those modes of operation. The optical viewfinder still image mode is a shooting mode in which a user takes a still image of an object while viewing the object image shown in the optical viewfinder. The live view still image mode is a shooting mode in which a user takes a still image of an object while viewing the object image shown in the electronic viewfinder. In the movie mode, a user takes a movie of an object while viewing the object image shown in the electronic viewfinder. In compact digital cameras and video cameras, an electronic viewfinder is typically employed to view an object. In other words, in compact digital cameras and video cameras, a still image shooting mode is the above-mentioned live view still image mode, and a movie shooting mode is the above-mentioned movie mode.

Patent Documents described above discuss techniques for improving the operability in switching between a live view still image mode and a movie mode, and do not discuss any techniques for improving operability in switching among three modes of operation including an optical viewfinder still image mode. In conventional digital single-lens reflex cameras, however, a complicated procedure is to be used to select an optical viewfinder still image mode, a live view still image mode, or a movie mode. For example, in many conventional digital single-lens reflex cameras, switching between an optical viewfinder still image mode and a live view still image mode may require pressing of a push button provided for purposes that are unrelated to mode switching, thus causing a user who is trying to switch the mode to press a wrong button. Likewise, operations for starting and stopping movie shooting also may require pressing of a push button provided for purposes that are unrelated to movie shooting; thus, this may cause a user performing the operation for starting or stopping movie shooting to press a wrong button down.

Furthermore, in many cases, a procedure used to switch between an optical viewfinder still image mode and a live view still image mode is the same as that used to switch between the optical viewfinder still image mode and a movie mode. Hence, such mode switching operation is difficult for a user who does not know that a viewfinder mode certainly becomes an electronic viewfinder mode when the live view still image mode or the movie mode is selected. In addition, in the case of a camera in which different mode-switching operations use the same procedure as described above, a user may erroneously press a movie start button while performing still image shooting in a live view still image mode, resulting in a misoperation in which unintended movie shooting occurs.

Moreover, in some digital cameras, switching between an optical viewfinder still image mode and a live view still image mode is performed by controlling a push button provided only for switching operation, while switching between the optical viewfinder still image mode and a movie mode is accomplished by turning a mode dial. A mode dial refers to typically an operation member used to select and set shooting conditions for still image shooting. For example, when a user selects a manual mode, still image shooting is performed based on the shutter speed and aperture value determined by the user. In switching operation performed using such a mode dial, the user can avoid a misoperation that may occur in a camera in which different mode-switching operations are carried out by the same procedure as described above. Nevertheless, since switching to a movie mode is made by rotating a mode dial, a user who desires to perform still image shooting during the movie mode cannot select still image shooting conditions, such as shutter speed and aperture value, in performing the still image shooting.

SUMMARY OF THE INVENTION

According to an aspect of the present invention, an apparatus includes a first operation member configured to switch the shooting mode between the still image mode and the movie mode by rotation, a second operation member provided in proximity to a rotation center of the first operation member and a control unit configured to effect control such that when the first operation member switches the shooting mode to the still image mode, a viewfinder mode is switched to an optical mode, and switching from the optical mode to an electronic mode is performed by operation of the second operation member, while when the first operation member switches the shooting mode to the movie mode, the viewfinder mode is switched to the electronic mode, and movie shooting is started by operation of the second operation member.

Further features and aspects of the present invention will become apparent from the following detailed description of exemplary embodiments with reference to the attached drawings.

BRIEF DESCRIPTION OF THE DRAWINGS

The accompanying drawings, which are incorporated in and constitute a part of the specification, illustrate exemplary embodiments, features, and aspects of the invention and, together with the description, serve to explain the principles of the invention.

DESCRIPTION OF THE EMBODIMENTS

Various exemplary embodiments, features, and aspects of the invention will be described in detail below with reference to the drawings.

With reference to the accompanying drawings, an example configuration of an image pickup apparatus according to an exemplary embodiment of the present invention will be described. The image pickup apparatus includes a digital single-lens reflex camera including an optical viewfinder and an electronic viewfinder and capable of still image shooting and movie shooting. It should be noted that the configuration of the exemplary embodiment described below does not limit the scope of the invention.

Figure 1A:
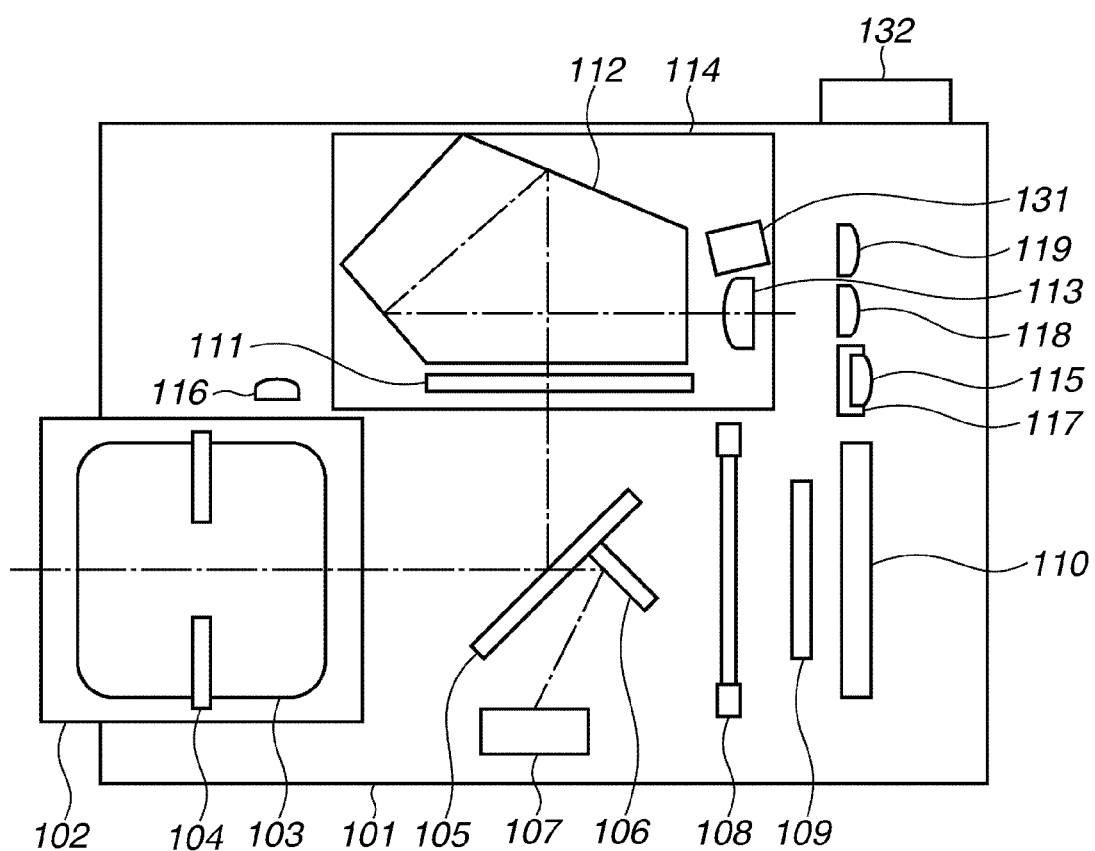
FIGS. 1A and 1B illustrate an example configuration of an image pickup apparatus including a digital single-lens reflex camera according to an exemplary embodiment of the invention.
Figure 1B:
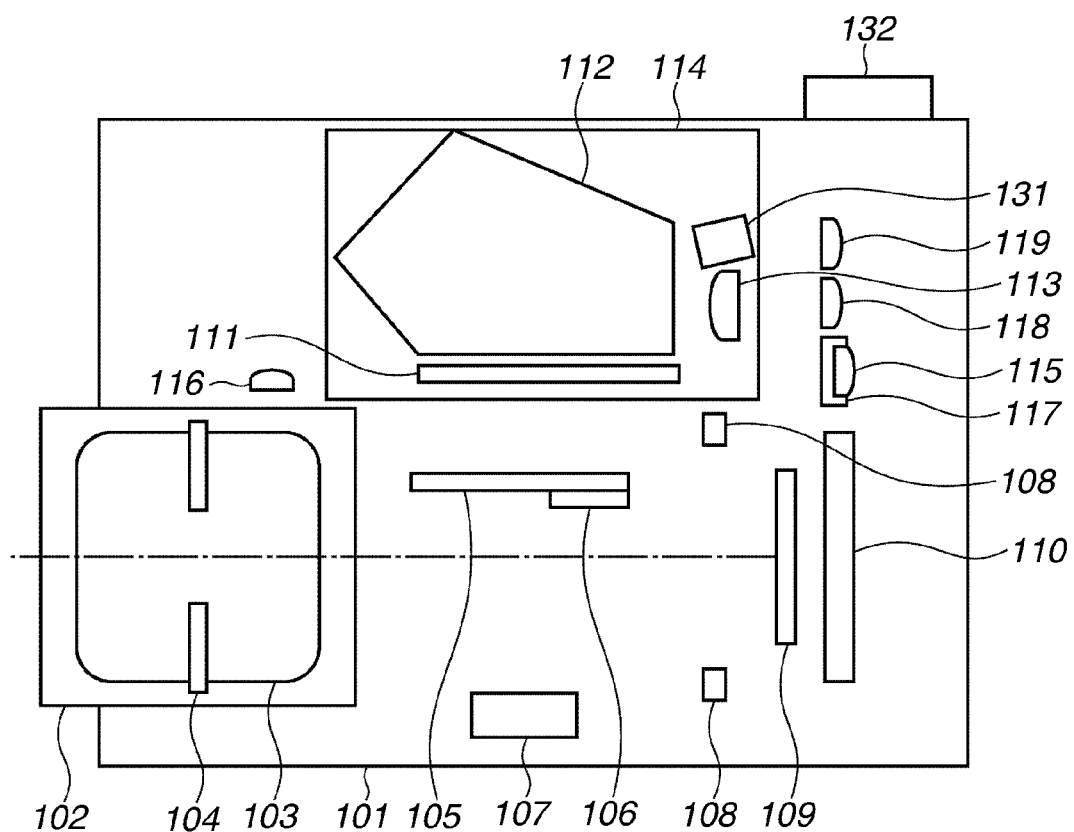

FIG. 1A is an internal configuration diagram illustrating the mechanical configuration of the image pickup apparatus according to the exemplary embodiment when an object image is viewed in an optical viewfinder mode. FIG. 1B is an internal configuration diagram illustrating the mechanical configuration of the image pickup apparatus of the exemplary embodiment when an object image is viewed in an electronic viewfinder mode. In FIGS. 1A and 1B, the image pickup apparatus includes: a camera body 101; a removable imaging lens 102; and an image-forming optical system 103 disposed in the imaging lens 102 to form an image of an object on an image sensor 109. The image pickup apparatus further includes an aperture mechanism 104 provided in the imaging lens 102 to adjust the amount of exposure by changing the aperture diameter. When an object image is viewed in the optical viewfinder mode, a main mirror 105 including a movable half mirror reflects part of light sent from the image-forming optical system 103 to send the reflected light toward a viewfinder optical system 114, as shown in FIG. 1A. A movable sub-mirror 106 disposed on the back of the main mirror 105 reflects a part of the light flux passing through the main mirror 105 which travels close to the optical axis, to send the reflected light toward a focus detection unit 107. The image pickup apparatus further includes a shutter mechanism 108.

In the electronic viewfinder mode, the main mirror 105 and the sub-mirror 106 swing out of the optical path as shown in FIG. 1B. As the mirrors 105 and 106 swing out, the shutter mechanism 108 opens to guide light flux from the imaging lens 102 directly to the image sensor 109. The image pickup apparatus further includes a display unit 110 disposed on the back of the camera body 101. In the electronic viewfinder mode, an object image formed on the image sensor 109 is photoelectrically converted to image data, and the image data is subjected to image processing to display the image on the display unit 110. The image pickup apparatus further includes: a focusing screen 111 provided as an object-image-forming plane in the viewfinder optical system 114; a pentaprism 112; and an eyepiece lens 113 for viewing an optical viewfinder image. These focusing screen 111, pentaprism 112, and eyepiece lens 113 form the viewfinder optical system (optical viewfinder) 114. The image pickup apparatus also includes a light metering unit 131 disposed within the viewfinder optical system 114. The image pickup apparatus further includes a start-stop button (a second operation member) 115, a release switch 116, a shooting mode selector lever (a first operation member) 117, an AF operation mode selector button 118, a selector button 119 for light metering operation mode, and a mode dial 132. The shooting mode selector lever 117 switches the shooting mode between a still image shooting mode and a movie shooting mode.

Figure 2:
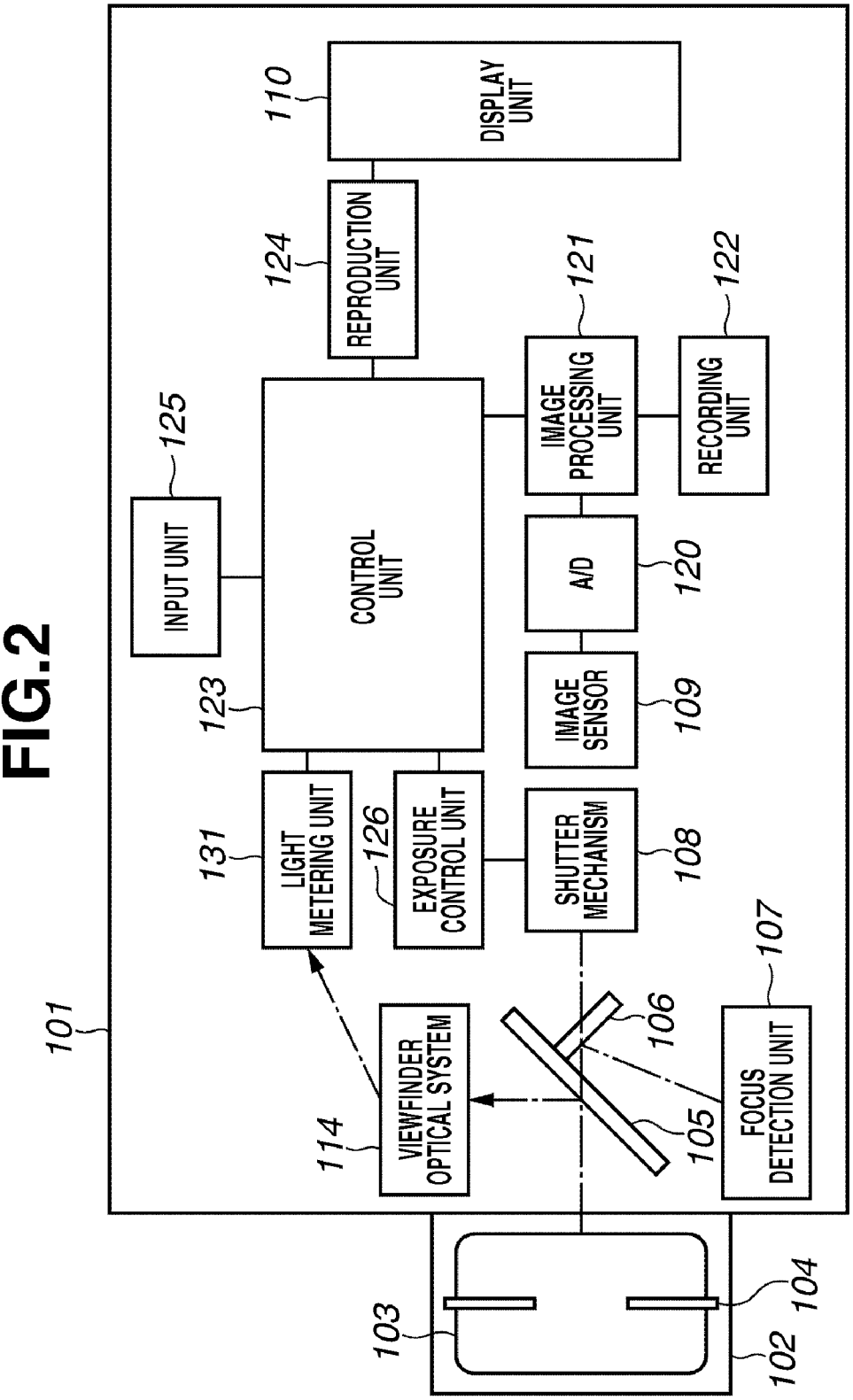
FIG. 2 is a block diagram illustrating the electrical configuration of the image pickup apparatus according to the exemplary embodiment of the invention.

Referring to the block diagram in FIG. 2, the electrical configuration of the image pickup apparatus according to the exemplary embodiment will be described. In FIG. 2, an A/D conversion unit 120 converts an analog image signal output from the image sensor 109 to a digital image signal. An image processing unit 121 performs processing on the digital image signal output from the A/D conversion unit 120. Such processing includes various corrections on pixel information, conversion of a RGB signal to a YC signal, white balance processing, gamma correction processing, and signal interpolation processing.

A recording unit 122 records image information obtained by the image processing unit 121. A control unit 123 controls the members forming the camera body 101. Although not shown, the control unit 123 includes, for example, a central processing unit (CPU), read only memory (ROM) that stores programs executable by the CPU, and random access memory (RAM) used by the CPU for calculation. A reproduction unit 124 converts the image information recorded by the recording unit 122 into the form of a signal that can be displayed as an image on the display unit 110. When a user switches a mode to the still image shooting mode using the shooting mode selector lever 117, the control unit 123 effects control to switch the viewfinder mode to the optical viewfinder mode. In this situation, if the user presses the start-stop button 115, the control unit 123 effects control to switch the viewfinder mode from the optical viewfinder mode to the electronic viewfinder mode.

On the other hand, when the user switches a mode to the movie shooting mode using the shooting mode selector lever 117, the control unit 123 effects control to switch the viewfinder mode to the electronic viewfinder mode. In this situation, if the user presses the start-stop button 115, the control unit 123 effects control to start movie shooting. During the movie shooting, if the user presses the start-stop button 115, the control unit 123 effects control to terminate the movie shooting. The start-stop button (second operation member) 115, the release switch 116, the shooting mode selector lever (first operation member) 117, the AF operation mode selector button 118, the light metering operation mode selector button 119, the mode dial 132, and other members form an input unit 125.

Figure 3A:
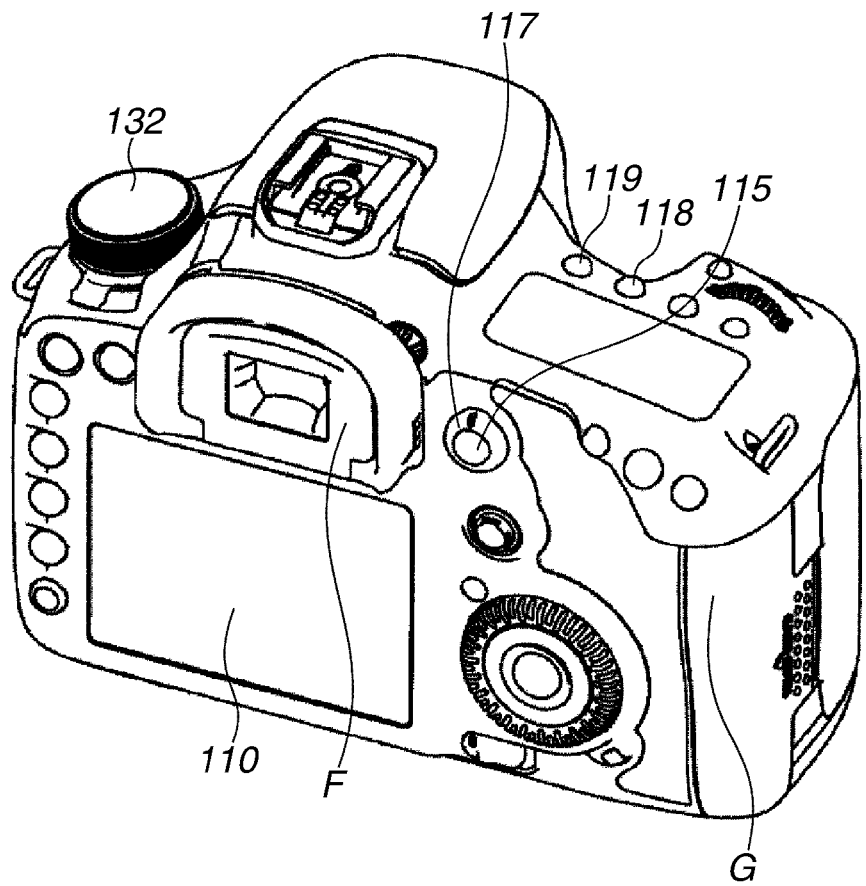
FIGS. 3A and 3B illustrate the configurations of a start-stop button and shooting mode selector lever in the image pickup apparatus according to the exemplary embodiment of the invention.

Now, with reference to FIGS. 3A and 3B, the configurations of the start-stop button 115 and shooting mode selector lever 117 will be described, which are features of the image pickup apparatus according to the exemplary embodiment. FIG. 3A is an external view of the image pickup apparatus according to the exemplary embodiment. As shown in FIG. 3A, the start-stop button 115 and the shooting mode selector lever 117 are disposed on the back of the camera body 101 that is located closer to a grip G than an eyepiece unit F of the optical viewfinder. When a user holds the grip G of the camera body 101 with the right hand to shoot an image, the user will find the start-stop button 115 and the shooting mode selector lever 117 easy to use. This is because the start-stop button 115 and the shooting mode selector lever 117 are in the positions that allow the user to manipulate the start-stop button 115 and the shooting mode selector lever 117 with the thumb of the right hand holding the grip G. Furthermore, the start-stop button 115 and the shooting mode selector lever 117, each located in proximity to the display unit 110, are easy for a user to manipulate when the user is viewing the display unit 110, thus providing excellent usability.

Figure 3B:
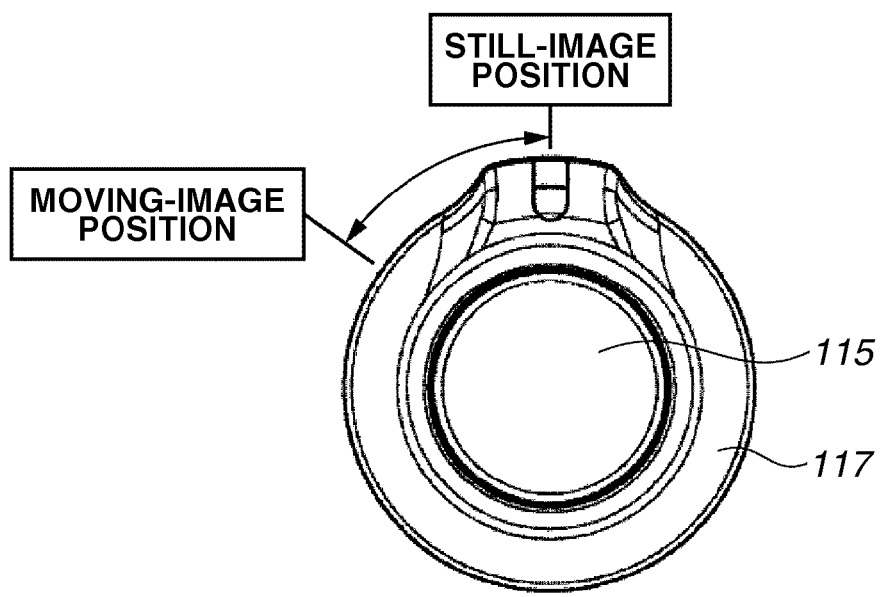

FIG. 3B is an external view illustrating in greater detail the configurations of the start-stop button (second operation member) 115 and shooting mode selector lever (first operation member) 117. As seen in FIG. 3B, the shooting mode selector lever 117 is provided in the form of a circular rotary lever. The start-stop button 115 is placed in close proximity to the rotation center of the shooting mode selector lever 117. In this way, those related functions are placed in close proximity to each other, thereby providing improved usability.

In a situation in which the shooting mode selector lever 117 is in the still-image-shooting-mode position, if a user presses the start-stop button 115, the main mirror 105 and the sub-mirror 106 swing out of the optical path as shown in FIG. 1B. As the mirrors 105 and 106 swing out, the shutter mechanism 108 opens to guide light flux from the imaging lens 102 directly to the image sensor 109, allowing the user to view the object on the display unit 110. Specifically, when a user performs switching to the still image shooting mode for shooting still images using the shooting mode selector lever 117, the viewfinder mode is forced into the optical viewfinder mode. In this situation, to switch the viewfinder mode to the electronic viewfinder mode, the user, after switching to the still image shooting mode using the shooting mode selector lever 117, presses the start-stop button 115 to switch from the optical viewfinder mode to the electronic viewfinder mode. Since the viewfinder mode is the electronic viewfinder mode as a result of the pressing of the start-stop button 115, if the user presses once again the start-stop button 115, the viewfinder mode will switch from the electronic viewfinder mode to the optical viewfinder mode. More specifically, if the user presses once again the start-stop button 115, the main mirror 105 and the sub-mirror 106 return to their positions on the optical path as shown in FIG. 1A.

As the mirrors 105 and 106 return to their positions on the optical path, the shutter mechanism 108 closes to guide light flux from the imaging lens 102 toward the viewfinder optical system 114 (toward the optical viewfinder), allowing the user to view the object through the eyepiece lens 113. In other words, the viewfinder mode is switched from the electronic viewfinder mode to the optical viewfinder mode.

When a user rotates the shooting mode selector lever 117 from the still-image-shooting-mode position to the moving-image-shooting-mode position, the main mirror 105 and the sub-mirror 106 swing out of the optical path as shown in FIG. 1B. As the mirrors 105 and 106 swing out, the shutter mechanism 108 opens to guide light flux from the imaging lens 102 directly to the image sensor 109, allowing the user to view the object on the display unit 110. More specifically, by switching to the movie shooting mode using the shooting mode selector lever 117, the viewfinder mode is forced into the electronic viewfinder mode from the optical viewfinder mode. During the movie shooting mode, switching to the optical viewfinder mode is not possible. Since the shooting mode selector lever 117 is in the moving-image position, if the user presses the start-stop button 115, movie shooting will start.

If the user presses once again the start-stop button 115, the movie shooting is stopped. Further, with the image pickup apparatus, a user can select, using the mode dial 132, shooting conditions for performing still image shooting during the movie shooting mode. To be specific, when the shooting mode selector lever 117 is in the moving-image position, a user can select a still image shooting mode, such as a shutter speed priority mode and an aperture value priority mode, by manipulating the mode dial 132, and can shoot a still image by actuating the release switch 116.

As set forth above, according to the exemplary embodiment of the present invention, the viewfinder mode is switchable between the optical viewfinder mode and the electronic viewfinder mode, while the shooting mode is switchable between the still image shooting mode and the movie shooting mode. Accordingly, the present invention can provide a digital single-lens reflex camera improving operability of mode switching.

Aspects of the present invention can also be realized by a computer of a system or apparatus (or devices such as a CPU or MPU) that reads out and executes a program recorded on a memory device to perform the functions of the above-described embodiments, and by a method, the steps of which are performed by a computer of a system or apparatus by, for example, reading out and executing a program recorded on a memory device to perform the functions of the above-described embodiments. For this purpose, the program is provided to the computer for example via a network or from a recording medium of various types serving as the memory device (e.g., computer-readable medium). In such a case, the system or apparatus, and the recording medium where the program is stored, are included as being within the scope of the present invention.

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures, and functions.

This application claims priority from Japanese Patent Application No. 2009-195466 filed Aug. 26, 2009, which is hereby incorporated by reference herein in its entirety.

What is claimed is:

1. An image pickup apparatus comprising:
a first operation member configured to switch a between a first position still and a second position by rotation;
a second operation member provided in proximity to a rotation center of the first operation member; and
a control unit configured to switch a shooting mode between a still image mode and a movie mode, to switch a viewfinder mode between an optical mode and an electronic mode, and to start and stop a movie recording,
wherein the control unit switches the shooting mode into the still image mode and the viewfinder mode is forced into the optical viewfinder mode in a case when the position of the first operation member is switched from the second position to the first position, wherein the control unit switches the shooting mode into the movie mode and the viewfinder mode is forced into the electronic viewfinder mode from the optical viewfinder mode in a case when the position of the first operation member is switched from the first position to the second position, wherein the control unit switches the viewfinder mode between the optical mode and the electronic mode alternately according to operation of the second operation member in a case when the first operation member is positioned at the first position, and wherein the control unit starts and stops the movie recording alternately according to operation of the second operation member in a case when the first operation member is positioned at the second position.

2. The image pickup apparatus according to claim 1, further comprising:
a mode dial configured to select, when the shooting mode is the movie mode, a shooting condition for still image shooting to be performed in that movie mode.

3. The image pickup apparatus according to claim 1, wherein the first and second operation members are disposed on a back of the image pickup apparatus and on an area closer to a grip portion of the image pickup than an eyepiece unit on which an image is visible when the apparatus is in the optical viewfinder mode.

* * * * *